United States Patent [19]

Lange

[11] 4,050,128
[45] Sept. 27, 1977

[54] MILLING CUTTER

[75] Inventor: Klaus Lange, Vaihingen, Enz, Germany

[73] Assignee: Biax-Werkzeuge K.G. Wezel & Co. Prazisionswerkzeug-Fabrik, Maulbronn, Germany

[21] Appl. No.: 700,961

[22] Filed: June 29, 1976

[30] Foreign Application Priority Data

July 24, 1975 Germany ............................ 2533079

[51] Int. Cl.² .............................................. B26D 1/12
[52] U.S. Cl. ........................................ 407/59; 407/62
[58] Field of Search ............................ 29/103 R, 103 A

[56] References Cited

U.S. PATENT DOCUMENTS

| 3,133,339 | 5/1964 | Ribidh | 29/103 A |
| 3,775,819 | 12/1973 | Ribich | 29/103 A |

FOREIGN PATENT DOCUMENTS

| 1,230,614 | 4/1960 | France | 29/103 A |
| 672,117 | 5/1952 | United Kingdom | 29/103 R |

Primary Examiner—Harrison L. Hinson
Attorney, Agent, or Firm—Michael J. Striker

[57] ABSTRACT

A milling cutter rotatable about a central axis in a predetermined rotational sense has a plurality of helical blades separated by helical flutes and each formed with a row of teeth each having an axially directed end flank and a radially outwardly turned side flank. Each of the side flanks is inclined toward the axis by an angle between 3° and 15° from a high end at the respective end flank to a low end. Each of the teeth is further formed with a rounded chamfer at the high end and between the flanks. Each of the rows of teeth is axially offset from the circumferentially flanking rows with the rounded chamfers of each row being aligned circumferentially relative to the rotational sense behind the respective low ends of the row in front.

10 Claims, 3 Drawing Figures

MILLING CUTTER

BACKGROUND OF THE INVENTION

The present invention relates to a milling cutter. More particularly this invention concerns an integral helical-tooth plain milling cutter.

A milling cutter is known having a plurality of helical blades separated by helical flutes and each formed as a row of teeth. It has been found that the use of sawtooth-shaped teeth with the teeth in each row being staggered axially relative to the teeth in circumferentially flanking rows greatly increases the material-removing capacity of such a milling cutter.

Typically, such a cutter has an axially directed end flank whih lies substantially in a plane perpendicular to the rotation axis of the cutter and a side flank which is inclined relative to this axis. The side and end flanks of each tooth meet at a sharp tip. On rotation of the cutter in its predetermined rotational sense these sharp tips are the first parts of the cutter to contact the workpiece. Consequently, the tips on such a cutter have a tendency rapidly to wear, thereby dulling the cutter. Furthermore, the cladding of such a cutter with a hard alloy or metal such as carbide or the complete manufacture of such a cutter out of a hard alloy or metal is virtually impossible with this formation.

Such a cutter also is normally urged axially by a component of a force when it contacts the workpiece. Such axial urging frequently can displace the cutter in the chuck holding it and, therefore, ruin the workpiece being milled, or at least make a sloppy cut therein.

SUMMARY OF THE INVENTION

It is therefore an object of the present invention to provide an improved milling cutter.

Another object is the provision of such a cutter which has a long service life and which can be made completely out of a hard alloy.

An other object is to provide a cutter which is so formed as not to slip axially in the chuck during use.

These objects are attained according to the present invention in a milling cutter of the above-described general type wherein each of the teeth is formed between its side flank and its end flank with a rounded chamfer. Furthermore in accordance with this invention each of these chamfers is circumferentially aligned behind the low end of the side flank of the tooth in front of this chamfer relative to the predetermined rotational sense of the cutter. Accordingly to this invention each of the side flanks is inclined at an angle between 3° and 15° to the axis of the cutter.

With the system according to the present invention sharp sawteeth are replaced with a rounded region which therefore constitutes the first portion of the cutter to engage the workpiece. Each of these rounded regions is set back in the working direction radially by a distance equal to the axial length of the triangular tooth times the sign of the pitch angle of the blades of flutes. Thus during material removal the blade/workpiece contact point moves continuously from the low end of each tooth along to the high end thereof and ends at the base of the next tooth. Advantageously in accordance with this invention the rows of teeth are each formed with a plurality of transverse circumferential grooves each between a respective low end of a tooth side flank and the adjacent end flank of the next tooth. This has a chip-breaking effect which ensures rapid material removal. In addition, such a formation prevents the teeth from sharply striking the workpiece so that the hard metal of the cutter is not excessively strained in order that a long service life can be obtained and breaking-off of the teeth and similar wear is largely eliminated.

In accordance with another feature of this each of the side flanks is inclined toward the axis away from the shaft of the cutter. Thus a passive component of force tends to push the cutter into the chuck receiving the cutter while the pitch is such that an active component of force tends to push it in the opposite direction. These forces effectively cancel each other out so as to eliminate the possibility that the tool will move in the chuck holding it. This is particularly useful when the shaft is a smooth cylindrical surface, as otherwise it is necessary to clamp the thing with exceptionally great pressure in order to insure that it will not slip in the chuck.

According to a further feature of this invention each of the rounded chamfers is tangent to the respective side flank at the respective high end thereof and each end flank is a rounded continuation of the respective chamfer. Each chamfer with its respective end flank has a common center of curvature and a radius of curvature around the respective center equal to between 0.5 and 4.5 mm. Furthermore, each of the side flanks has a length of between 2 mm and 20 mm.

In the cutter according to the present invention each of the teeth has a clearance angle equal to between 6° and 8° and a positive radial rake angle equal to between 0° and 3°. With a tool so constructed it is possible to achieve smooth surface having a smoothness equal to approximately 40 μ. In accordance with the invention six such blades are employed. The pitch angle of the blades is increased as the miller diameter is increased. Similarly the length of the base of the triangle formed by the sawteeth is increased with an increase in cutter diameter.

Such a cutter produces only very small chips so that only a very small chip room may be provided. Thus it is possible to provide a very stable tool. Due to the low machining force necessary a long service life with a quietly operating and vibration-free tool is obtained. In addition the material removal rate is relatively high with this tool so that the machining advance speed can also be quite high.

According to this invention the cutter is entirely and integrally made of high-speed tool steel. It is also possible to use non-ferrous alloys and equivalent castings.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

SPECIFIC DESCRIPTION OF PREFERRED EMBODIMENT

Figure 1:
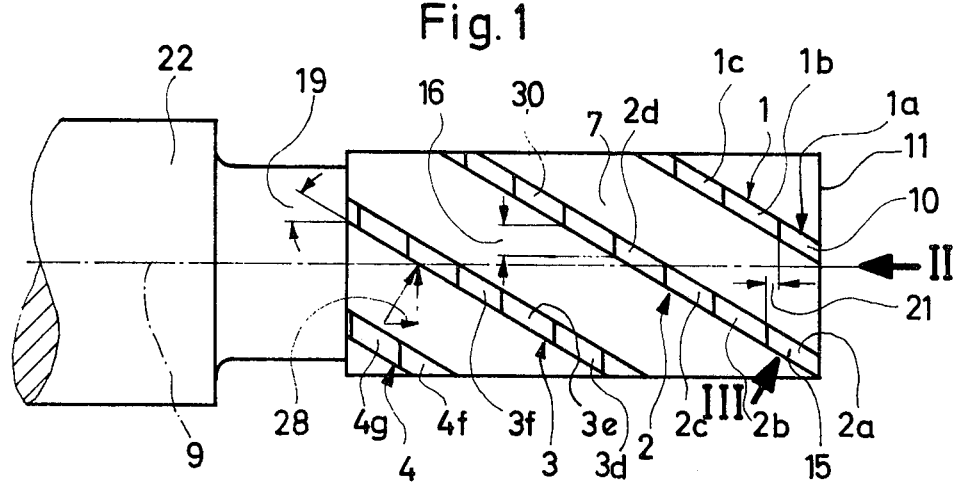
FIG. 1 is a radial view of a milling cutter according to this invention.
Figure 2:
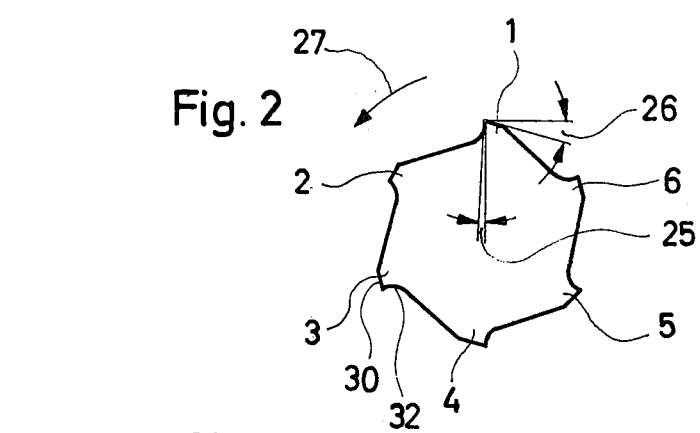
FIG. 2 is an end view taken in the direction of arrow II of FIG. 1.
Figure 3:
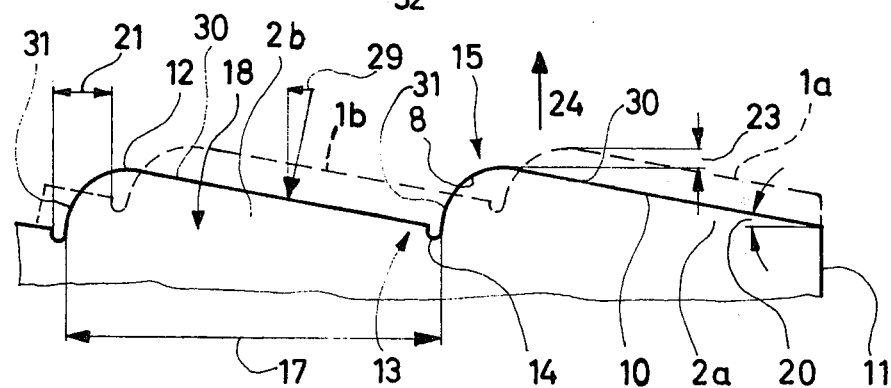
FIG. 3 is a large-scale view taken in the direction of arrow III of FIG. 1.

The milling cutter shown in FIGS. 1 - 3 has six helical blades 1 - 6 separated by flutes 7. The row 1 is formed of a plurality of teeth 1a, 1b, 1c . . . , the blade 2 by teeth 2a, 2b, 2c . . . and so on. Each of these teeth 1a, 1b, . . . 2a, 2b, . . . are generally triangular or sawtooth-shaped and have a side flank 10 and an end flank 31 as best shown in FIG. 3. Between these flanks 10 and 31 each of the teeth is formed with a cylindrically rounded chamfer 8. Each of the side flanks 10 is inclined at an angle 20 equal to between 3° and 15° to the axis 9 of the cutter, from a high end 15 toward a low end 13 turned toward the end 11 of the cutter which is opposite the shaft 22 thereof.

Each of the chamfers 8 is tangential at a point 12 to the high end 15 of the respective side flank 10 and terminates inwardly at a transverse groove 14 at the low end 13.

The high end 15 of each of the flanks 10 is circumferentially spaced by a distance 16 behind the respective low end 13. This distance 16 corresponds to the axial length 17 of each tooth relative to the triangle 18 formed thereby multiplied by the sign of the helix angle 19 of the tooth.

Each of the teeth 1a - 6g is offset from the corresponding tooth of the row in front by a distance 21 in a direction toward the end 11. The axial offset 21 is equal to the distance 17 divided by the number of teeth in each of the rows 1 - 6.

FIG. 3 shows teeth 1a and 1b in dot-line in the same plane as the solid-line teeth 2a and 2b and offset by a spacing 23 in the direction of arrow 24 therefrom. The blades 1 - 6 have a positive radial rake angle 25 equal to between 0° and 30° and the teeth 1a - 6g have a clearance angle or primary clearance 26 equal to between 6° and 8°.

In use the milling head is rotated about its axis 9 in the direction of arrow 27, so that this tool is a right-hand miller. The shaft 22 is held in a chuck during such rotation. Due to the inclination of the side flanks 10 a component of force 28 is effective in one direction whereas an opposite force 29 is effective in the opposite direction so as to prevent axial displacement of the tool in the chuck. With such a miller the first portion of the cutting edge 10 to come into contact with the workpiece will be the low portion 13, thereafter the contact region moving along to the horizontal end 15. Thus a relatively smooth cut is obtained so that the cutter is subject to relatively limited wear and will have a long life. The ladn 30 from above the cutting edge 10 and the tooth face 32 will therefore not wear readily. At the same time a relatively fast cut can be made. Thus the tool is made of hard metal or a hard metal alloy.

Of course with a left-hand miller the above-given relationships with all be substantially reversed with the same advantageous effects.

It will be understood that each of the elements described above, or two or more together, may also find a useful application in other types of construction differing from the types described above.

While the invention has been illustrated and described as embodied in a milling cutter, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A milling cutter rotatable about a central axis in a predetermined rotational sense and having an axially extending shaft adapted to be held in a chuck and a plurality of helical blades separated by helical flutes and each formed as a row of teeth each having an axially directed end flank turned toward said shaft and a radially outwardly turned side flank, each of said side flanks being inclined toward said axis away from said shaft from a high end at the respective end flank to a low end, each of said teeth further being formed with a rounded chamfer at said high end and between said flanks, each of said rows of teeth being axially offset from the circumferentially flanking rows with the rounded chamfers of each row being aligned circumferentially relative to said sense behind the respective low ends of the row in front.

2. The cutter defined in claim 1 wherein each of said side flanks is included at an angle between 3° and 15° to said axis.

3. The cutter defined in claim 2 wherein each of said rounded chamfers is tangent to the respective side flank at the respective high end thereof, each end flank being a rounded continuation of the respective chamfer.

4. The cutter defined in claim 3 wherein each of said chamfers and the respective end flank have a common center of curvature.

5. The cutter defined in claim 4 wherein each of said chamfers and the respective end flank have a radius of curvature drawn to the respective center equal to between 0.5 and 4.5 mm.

6. The cutter defined in claim 5 wherein each of said side flanks has a length between 2 mm and 20 mm.

7. The cutter defined in claim 2 wherein each of said rows of teeth is formed with a plurality of transverse circumferential grooves each between a respective low end and the adjacent end flank.

8. The cutter defined in claim 2 wherein each of said teeth has a clearance angle equal to between 6° and 8° and a positive radial rake angle equal to between 0° and 3°.

9. The cutter defined in claim 2 wherein each of said rows of teeth is axially offset from the flanking rows of teeth by a distance equal substantially to the axial tooth length divided by the number of teeth per row.

10. A milling cutter rotatable about a central axis in a predetermined rotational sense and having a plurality of helical blades separated by helical flutes and each formed as a row of teeth each having an axially directed end flank and a radially outwardly turned side flank, each of said side flanks being inclined toward said axis from a high end at the respective end flank to a low end, each of said teeth further being formed with a rounded chamfer at said high end and between said flanks, each of said rows of teeth being axially offset from the circumferentially flanking rows by a distance equal substantially to the axial tooth lengths divided by the number of teeth per row with the rounded chamfers of each row being aligned circumferentially relative to said sense behind the respective low ends of the row in front.

* * * * *